L. L. LANGSTROTH.
Bee Hive.
No. 9,300.
2 Sheets—Sheet 1.
Patented Oct. 5, 1852.
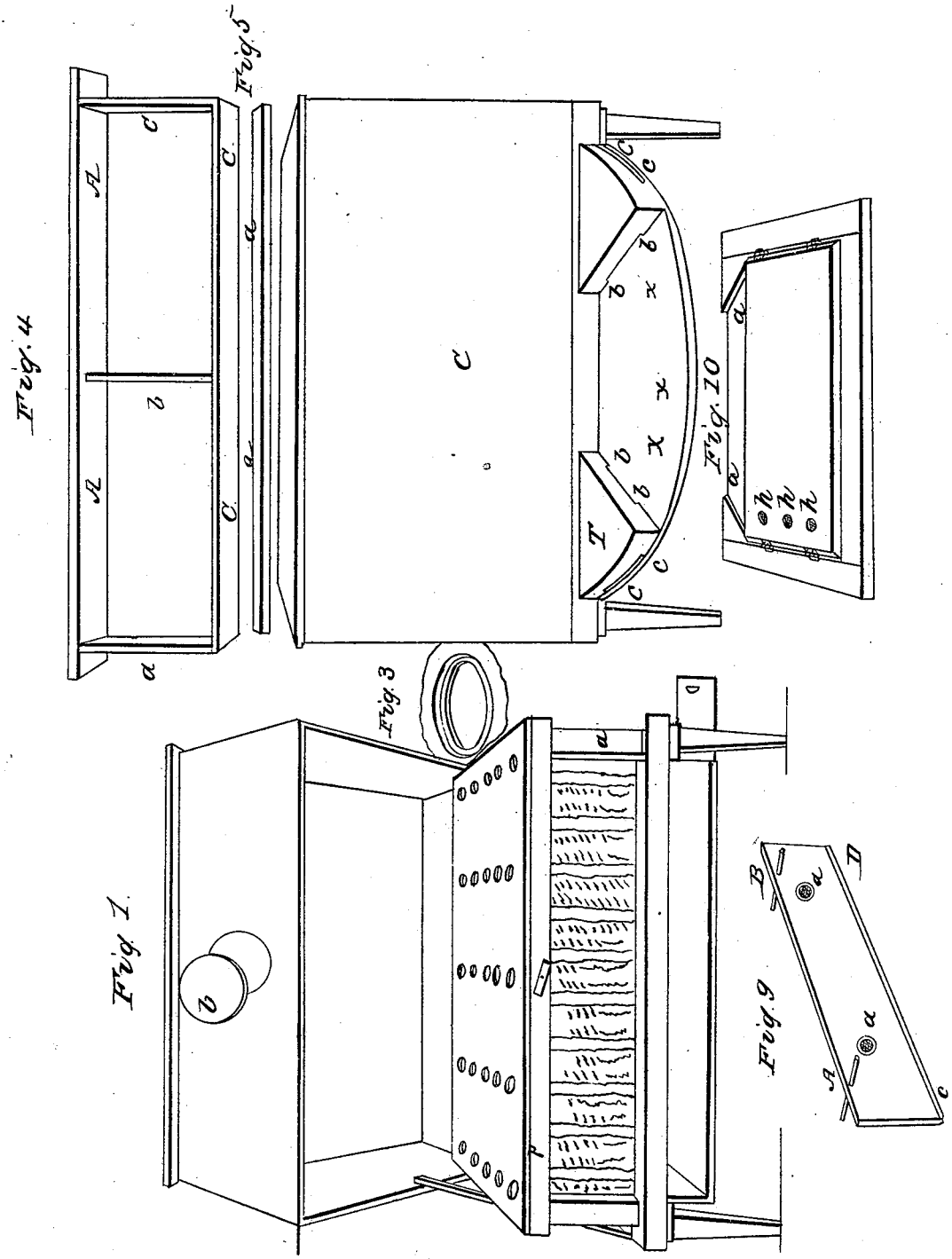

L. L. LANGSTROTH.
Bee Hive.
No. 9,300.
2 Sheets—Sheet 2.
Patented Oct. 5, 1852.
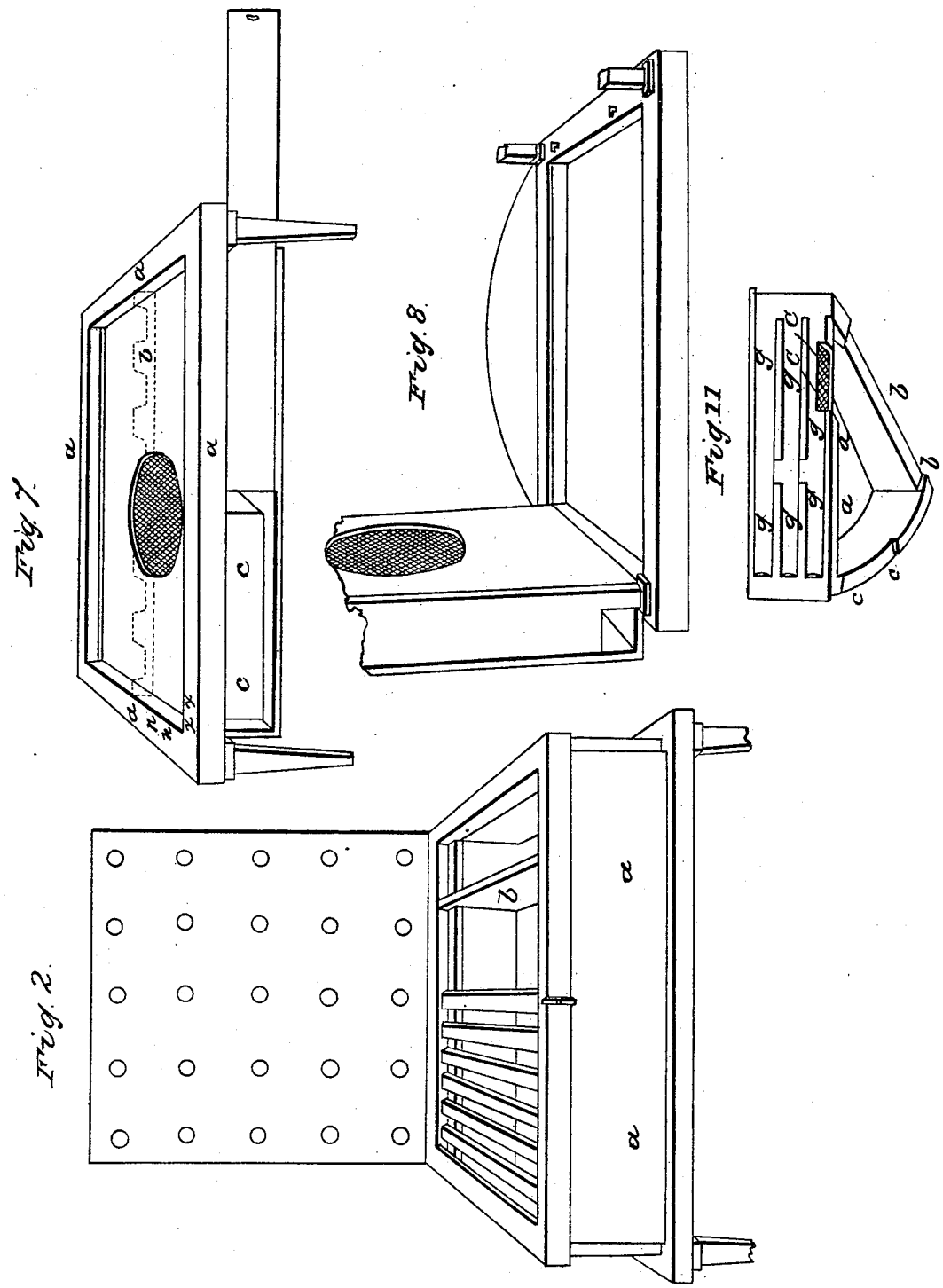

UNITED STATES PATENT OFFICE.

LORENZO L. LANGSTROTH, OF PHILADELPHIA, PENNSYLVANIA.

BEEHIVE.

Specification forming part of Letters Patent No. 9,300, dated October 5, 1852; Reissued May 26, 1863, No. 1,484.

*To all whom it may concern:*

Be it known that I, LORENZO L. LANGSTROTH, of Philadelphia, in the county of Philadelphia, State of Pennsylvania, have invented a new and Improved Mode of Constructing Beehives; and I do hereby declare that the following is a full and exact description thereof, reference being had to the accompanying drawings, and to the letters of reference marked thereon.

The nature of my invention consists: 1st, in affording the bees a more thorough protection against the bee-moth. 2d, in affording them a more effectual protection against extremes of heat and cold, sudden changes of temperature, and dampness in their hives. 3rd, in enabling the apiarian when desirable rapidly to multiply his colonies. 5th, in enabling him to obtain his surplus honey in the most convenient, beautiful and salable forms. 5th, in enabling him to perform all necessary operations without injuring a single bee. 6th, in enabling the most timid to remove the surplus honey without danger to themselves.

*Movable frames.*—To be able to remove the combs from the hive without mutilating them or seriously disturbing the bees, will secure the following advantages in the management of an apiary:—(1st.) The combs may at any time be readily examined for any purpose and thoroughly cleansed from the larvæ of the bee-moth. (2nd.) When the brood combs become too old, they may be renewed. (3rd.) Feeble colonies may be strengthened, by transferring to them from stronger colonies, combs containing honey and maturing brood. (4th.) Spare queens in embryo may be secured, either for creating artificial swarms or for supplying colonies which have lost their queen. (5th.) The queen of a hive may be easily caught, for any purpose. (6th.) Spare comb and honey may be easily removed. (7th.) Combs unsuitable for rearing workers may be removed and not allowed as in ordinary hives permanently to interfere with the prosperity of the colony. (8th.) New colonies may be multiplied to an extraordinary extent, the apiarian being made independent of the uncertainties and perplexities of natural swarming. In short to be able easily to remove the combs, and to transfer them from one hive to another, is indispensable to the scientific and most profitable management of bees.

Apiarians have aimed to effect these ends by placing movable bars or slats in the top of the hive, to which the combs may be attached. There are two difficulties in the practical working of these bars which have hitherto prevented their general use:

(1st.) The bees often attach the same comb partly on one bar and partly on another thus preventing its easy removal. (2nd.) They are compelled to attach the combs to the sides of the hive and these attachments must be severed before the bars can be removed. This often seriously annoys the bees and wastes the time both of the apiarian and the bees who must with much labor refasten all such combs in whatever hives they are put. To obviate these disadvantages I have invented a movable frame or compound bar—see, drawing Figure 4. A, is about one inch wide and one-quarter of an inch thick—C, C—a, b and c, are about one-quarter of an inch thick and about one inch wide. These should be about three eighths of an inch space between a and c, and the sides and C C and the bottom board of the hive this will prevent the bees from attaching the frame to the sides or bottom board of the hive, hindering its easy removal, and will allow them to pass freely between the sides and the bottom board, and the frame so as to afford no lurking place for moths or worms.—A series of such frames are placed as in Fig. 2—about half an inch apart on rabbets made in the front and back of the hive or in any other convenient way.

Fig. 5, a, a—is a small strip placed over the frames to hold them down, and to prevent the bees from attaching the ends of the frames to the blocks between which they rest, thus destroying the play which is necessary to their easy removal. This strip is just as wide as the rabbets on which the frames rest—(about half an inch)—and as thick as the depth of the rabbets below the sides of the hive and the top bars of the movable frames—the object of which depth is hereafter described. The construction of these frames is such as to induce the bees to attach each comb to a single frame. If I have clean worker comb I attach a small piece by dipping it into melted wax to A, and A. If I have none I draw a line of melted wax lengthwise across the center of the inside surface of A A, *a* and *c*—and on both sides of *b*. The bees commencing their combs at *f—f—* will build them in a true direction toward *b*, in order to attach them to it—and as they cannot fasten them to the sides of the hive, they will carry them also in a true direction toward *a*, and *c*. The bees in attaching their combs to the common bar will frequently make slight deviations from the line of the bar, as they are able to attach the combs anywhere to the sides of the hive. These deviations soon lead to the building of combs partly on one bar and partly on another. As the combs are never attached to the sides or bottom of the box or hive which contains my movable frames, they may at all times be easily removed. If the operation is carefully performed the bees seldom resent it but seem to be intent only on filling themselves with honey with which to return to their hive. If they exhibit any signs of anger a few whiffs of smoke from burning rags or paper or a slight sprinkling with sugar water will at once quiet and subdue them.

As there is a stratum of air always interposed between the combs and the sides and buttom board of the hive the bees are much more effectually guarded against extremes of heat and cold and the pernicious effects of condensed moisture than they can be in hives of the usual construction. These frames may be easily put together with small brads. It is obvious that the mode of constructing and inserting them in the hive may be varied, while the same important ends may be secured.

The rabbets on which the frames rest may be made about three quarters of an inch wide so as to give them a proper support and yet leave sufficient play to loosen them when they are to be removed from the hive and to regulate at will the distances between the combs.

*Shallow chamber or covered way.*—The arrangement for taking the spare honey of a hive should possess at least the following requisites: (1st) It should allow the bees, together with the heat and odor of the hive, to pass from all parts of the main hive, with the fewest impediments, to the receptacles for storing surplus honey. (2nd) It should be as well adapted to secure the storing of surplus honey in small, as in large receptacles. (3rd) It should enable the apiarian to remove the spare honey without injury to the bees, or danger to himself. (4th) It should admit of enlarging or contracting the space for storing surplus honey, so that the hive may be a swarming or non-swarming hive at the pleasure of its owner. I have invented a shallow chamber or covered way, which secures these and other advantages.

The bees, before entering the spare honey receptacles, are made to enter a chamber about half an inch deep, or just shallow enough to prevent them from occupying it with comb, they pass from this chamber, by suitable apertures, into the honey receptacles. This shallow chamber may be connected in various ways with the main hive, but to answer all its purposes to the best advantage, it ought to be over the top of a hive, furnished with bars. Fig. 2, shows the way in which I usually construct this shallow chamber. The rabbets which receive the movable frames or bars, are deep enough to form this chamber between the frames and the cover A. This cover is elevated in Fig. 2, and is shown in its proper position for holding the spare honey receptacles, in Fig. 1. It should be about half an inch thick, and clamped to prevent warping. It is fastened to its place by screws or hooks. Fig. 3, shows one of the apertures admitting the bees from the chamber into the honey receptacles. It is made by boring to a slight depth into the cover with a circular bit, and then through, with a smaller one so as to form a sunken ledge for a piece of zinc cut out with a punch, or anything else suitable for a cover. Any number of these or any other apertures, of any size, may be made in this cover, without, as in other hives, interfering with the arrangement of the combs below, or being liable to be more or less obstructed by the bees, and they made by opened or shut each one independently.

The bees will be able to pass, with the greatest ease, from between all the ranges of comb, into this chamber, just as though it were the upper part of their main hive, and from the chamber to any of the honey receptacles, instead of losing much valuable time, in the height of the gathering season, by crowding through a few inconvenient passages, as in the common hive.

When surplus honey is taken from the bees in large quantities at once, they are often so discouraged, that they refuse, for a long time, to enter the receptacles again, whereas if a few small receptacles are removed from time to time, they are stimulated to increased activity. The shallow chamber while it greatly facilitates the storing of spare honey in large boxes, is particularly adapted to the securing of it in small receptacles, in the most beautiful, convenient and salable forms. If desired, it may all be stored in quart, pint or even half pint tumblers, from which it may be removed, without being disfigured, in ornamental forms to grace the table.

There are other and more important reasons why the common arrangement for taking spare honey, cannot be applied successfully to small receptacles: (1st.) The building of comb requires a great amount of animal heat to be maintained by the bees, and hence they always work best when thep can economize their heat to the best advantage. But this they cannot advantageously do in tumblers or small receptacles communicating with the main hive through apertures made in its solid top or sides, because such apertures do not freely admit the heat from the main colony, and the bees are too few in number to keep up the requisite temperature. The shallow chamber, like the part of a warm room nearest to the ceiling is itself, in the working season, always full of the warmest air of the hive, and keeps the small receptacles filled with the same.

(2nd) Bees are always anxious to work in large numbers, so that they can easily intercommunicate with each other. The common arrangement for inducing them to work in small receptacles, is opposed to this instinct. But the shallow chamber affords a place of repose for multitudes of bees engaged in elaborating the wax to be used in the small receptacles above. As soon as a bee has a pellicle of wax formed in its wax pouch, it ascends into a receptacle to assist in comb-building. A constant succession of bees are thus ascending and descending, and they work in the small receptacles with scarcely any more isolation, and with almost as much rapidity, as though they were engaged in filling their main hive.

If a sufficient number of receptacles, or sufficient space in a few, is given to the bees—they will ordinarily be prevented from swarming. The honey may be removed in these receptacles, without any injury to the bees, or danger to their owner. If a slide of tin or zinc is pushed between the receptacle and the opening into the shallow chamber, and allowed to remain for five minutes or longer, the bees perceiving that they are separated from their companions, will gorge themselves with honey to be carried back to the hive. Then, if they are allowed to fly, they seek only to escape to their home, a bee when filled with honey, never, under any circumstances, acting on the offensive. This shallow chamber answers other important purposes. It prevents the bees from fastening with their pupolis the cover of the chamber, to the frames or bars of the hive—and thus enables it to be easily removed, to give access to the combs. It gives a space of air between the combs and the top of the hive, to guard the bees against extremes of weather, and sudden changes of temperature. It enables us to keep the feeder, in cool weather, filled with the heat of the hive—and it furnishes a warm and accessible place for feeding destitute colonies, in winter, with sugar or barley candy— which has been found to be the best and cheapest winter food for them.

By leaving one of the apertures in the cover of the chamber open during the cold weather, the moisture from the hive will escape, instead of condensing as it does upon the solid top of the common hive, to the great injury of the bees. Having already described the movable frames, it will be seen that the combs in my hive are kept some distance from the sides, top and bottom of the box or hive which contains them, and are thus, to a very extraordinary degree protected against moisture as well as sudden changes of temperature.

When small receptacles are used for storing the surplus honey, they are not near so apt to be occupied by the queen for breeding—as she generally prefers to keep her brood in large masses of comb.

In tumblers or round glasses just small enough to prevent the building of more than one comb—from the cylindrical shape of this comb—the cells will be of such various depths that they will from this cause be less likely to be occupied with brood.

*Divider.*—When a small swarm is put into a hive of the usual size, being unable to concentrate their animal heat, they cannot work to the best advantage. If they are placed in a small hive incapable of enlargement, the next season if not sooner, it is found to be too small. To obviate these difficulties, I have invented a divider to be inserted from the top of the hive between any of the ranges of comb, and to extend down to the bottom board of the hive. By its use, the hive may be adjusted to the size of the swarm, and yet may at any time be restored to its usual dimensions. This divider is also of great importance in rearing young queens, as a colony may be divided by it, and the part without a queen be compelled to rear young ones.

It is very serviceable in compelling destitute swarms which have not filled their hives with comb, to store up the food fed to them in the fall, instead of consuming it to build new comb. It will also enable them the better to concentrate their animal heat in winter, by shutting them off from the empty part of the hive. Fig. 9 shows the shape of this divider, A and B are the pins which rest upon the frames or bars. The bottom C D is chamfered to an edge, to prevent the crushing of the bees when the bottom board is opened and shut. a, a, are small holes covered with perforated zinc which may be screwed so as to open or shut these holes. By means of these ventilators new colonies put into different parts of the hive and separated by the divider may be made to have the same scent so as to be readily united—and colonies which have been divided into two or more families, so as to induce the part or parts without a queen to rear young ones, having the same odor may at any time be united so as to form again one vigorous stock.

Late in the fall several feeble colonies may be put into different divisions in the hive, and in a few days allowed to unite so as to form one vigorous stock—or they may be preserved as independent families, and the hive thus made up of several colonies may be used as a nursery for rearing queens for artificial swarming. Separate entrances can easily be given one on each of the four sides of the hive—so that four colonies may be made to tenant the hive. This divider may be made of thin wood or of zinc or glass or any other suitable material. Fig. 2[b] shows a divider with shoulders resting on the rabbets which support the bars when movable frames are not used or when no strips are used to confine the frames.

*Platform.*—The mode of supporting the hive should possess, at least, the following requisites: (1st) It should facilitate the easy handling of the hive for safe transportation or any other purpose. (2nd) It should allow it to be easily reëstablished in any new place without delay and expense in changing fixtures. (3rd) It should permit the bottom board of the hive to be easily opened and shut without injury to the bees. (4th) It should admit of the safe and speedy hiving of new swarms. (5th) It should afford no crevices for lurking places to the bee moth or its larvæ. I have invented a platform or mode of supporting my hives which possesses these and other desirable requisites. As this platform supports the hive and all its fixtures I shall describe in connection with it such parts of the hive as have not been previously, or are not to be hereafter, described.

Fig. 7, *a, a, a, a*, is a frame about one inch and a half thick, mortised or otherwise firmly put together. Its inside length and breadth are exactly the same with those of the box, Fig. 2, containing the combs. This box must be fastened down to the frame or platform, so that there may be no crevices between them, and so that the platform adds its own depth to the depth of the box. The box may be made of wood, but I very much prefer, for several important reasons, to have it of glass, set in a frame, Fig. 1. The posts *a* of this frame are about inch an a half square (their height depending upon the capacity desired to be given on the hive). They are mortised or strongly fastened into the platform, on its corners, so as to be just even with the inside edges of this platform *x, x, y, y*, Fig. 7. The top parts of this frame, are halved or rabbeted at the ends, so as to be firmly fastened down on the tops of the posts, by nails or screws. They are inch and a half wide, and thick enough to give a firm support to the frames after the rabbets have been made in front and rear for the movable frames and shallow chamber. The clear space between these posts, and between the under sides of the rails and the platform, should exceed by about one eighth of an inch the length and breadth of the panes of glass, so that there may be no difficulty from slight variations, of fitting them in. These panes of glass are then pushed in to the inside edges of the platform, and are prevented from going in any farther by small tins or brads. The bottom edge of the glass rests upon the platform. Thin strips of wood, about three quarters of an inch wide, are pushed in against the glasses, on the tops and sides, so as to close all apertures, while they form a support against which a second set of glasses, of the same size with the first, abut. These are fastened with small pieces of tin. A small amount of paint put upon the edges of the thin strips will keep the spaces between the glasses air tight. This arrangement enables us with ease to remove and replace broken glass in hives occupied by bees.

The extra cost of glass over wood is not great, and is much more than compensated by its advantages:

(1st.) The rational curiosity of the apiarian is gratified, and he is able at all times to ascertain the condition of his colonies.

(2nd.) A very great degree of protection is given to the bees against extremes and sudden changes of temperature. The space of perfectly confined air between the double glass, is one of the very best non-conductors of heat, and thus obviates the objection commonly urged against the use of glass. I have used double glass, for many years, and have found the bees to be better protected in such hives than in any others, unless where the wood is very thick, or doubled, and then the hives are both clumsy and expensive. Small covers of wood may be placed against the posts (see *a, a*, Fig. 2) and fastened by a button, leaving about half an inch space between them and the glass. This space, for greater protection, may be filled with tow, waste cotton. or any good non-conductor of heat.

(3rd) Another very important advantage of the double glass sides is the great protection which they furnish to the bees against the injurious, and often fatal effects of condensed and frozen moisture. A strong colony of bees is seldom if ever killed by cold alone—even in the thinnest hive. Their hives, however, are often filled with frost, and the bees being prevented from passing to the frosty combs containing their stores, perish, even in hives abundantly supplied with honey. Where the whole colony is not destroyed—the dampness, from the condensed moisture and thawing frost in common hives, often causes the combs to mold, destroys many bees and injures seriously the health of the whole colony. By means of the movable frames the comb in my hives are prevented from being attached to the sides, as they are by the common arrangement. If, then, the moisture can be prevented from condensing any where over the bees, where it may fall upon them or their combs—and if wherever it condenses it may be easily discharged from the hives—it cannot seriously annoy them.

The arrangement used in my hive, or one on substantially the same principles, is I believe the only one by which the bees can be thoroughly protected at all seasons, from the injurious effects of dampness in their hives—which in climates of cold winters is an enemy scarcely less formidable than the bee moth itself: (1st) My plan by giving them uncommon protection against extremes and sudden changes of temperature—and by affording a vent above the hive for the escape of moisture, diminishes as far as possible the condensation of moisture in the hive. (2nd) By making the sides of the hive of glass, they are always the coldest parts of the hive, and the moisture will be condensed upon them, in preference to any other part of the interior—just as it is upon the walls rather than the floor or ceiling of a cold room. But as the bees are kept away from the sides of the hive—this moisture cannot annoy them, or wet their combs. It cannot penetrate glass as it does wooden sides—to cause a protracted dampness—but runs down their smooth surfaces, and may thus be easily discharged from the hive.

I have thus succeeded in making the worst property of glass, its rapid conduction of heat—one of its best, for the purposes of a bee hive—and in successfully employing a material which unites so many desirable requisites.

The inside dimensions of the box containing the combs, as I usually construct it, are as follows: Lenth, eighteen inches and one eighth. This will give room for twelve movable frames. Breadth, twelve inches and one eighth. The extra eighth of an inch is to enable me to have sufficient play for slight variations in the glass. Depth below the rabbets nine or ten inches—including in this the depth of the platform. Whatever shape is used the size of the movable frames should always be uniform so that they may fit in every hive in the same apiary.

There must be room, on the upper surface of the platform $a, a, a, a$, Fig. 7, not only for the box which has just been described, but for an outside cover of this box, made of about three quarter inch stuff—between which and the box, there ought to be about an inch of clear space. Fig. 6 shows this cover in its proper position on the hive. It ought to be in the clear, not less than seven inches higher than the board which covers the shallow chamber, and while the top of it projects slightly on all sides, it should slope from the front to the rear, to carry off the rain, and at the same time discharge it away from the alighting board.

In Fig. 1 a small opening with its cover is shown on the back of the cover to the hive, which may be used when it is desired to have a current of air through the hive, to carry off moisture or for any other purpose. It gives access also to a small button which fastens down the cover. A lock may be used where it is judged necessary.

Fig. 10 shows the under side of the platform; $a, a,$ is a sunken entrance for the bees, about three eighths of an inch deep, which is covered by a projecting alighting board, extending about eight inches in front of the hive. It is screwed to the front under surface of the platform, Fig. 8, and is shown in its proper position, Fig. 6. It should be well clamped to prevent warping The bottom board to the hive may be a box, as is represented in Fig. 8, where it is dropped, or Fig. 7 where it is closed. It has gauze wire on its upper surface next to the bees, Fig. 7, and two sides (only one of which is seen in the figure) to regulate the admission of air. $c, c$ is a block which may be pushed into the box, just far enough to allow air to pass between it and the slide, so that when the slide is shut far enough partially to hide the block, the bees may have air given to them, without light. This box bottom board will give the bees great protection against extremes and sudden changes of weather. By filling it in winter with sawdust, or some other good non-conductor of heat, still greater protection may be given.

Fig. 10 shows a solid bottom board made of inch and a quarter stuff, and well clamped to prevent warping. The front edge of the bottom board and the back edge of the alighting board are chamfered off to an edge, so that there may be no harbor for moths or worms. $h, h, h,$ are holes made like Fig. 3, the ledge is sunk deep enough to hold gauze wire ventilators, and a cover like that of Fig. 3.

Ventilation beyond what is effected by the bees themselves, is often of much importance in the hands of the skilful apiarian, to the ignorant and careless it is worse than useless. Such are advised never to open the ventilators $h, h, h,$ unless when their bees are shut up, for any reason, in the hive.

The bottom board (whether a box or solid) should exceed or fall short of by about one-eighth of an inch, the inside dimensions of the platform and is hinged so as to project all around about one-sixteenth of an inch over the under side of the platform or to recede the same distance from it. Fig. 10 shows the arrangement when it recedes, Fig. 8 when it projects. In Fig. 8 buttons are shown which keep it short, in Fig. 10 hinges which are fastened by a movable pin. As the bottom board is clamped on the ends where the fastenings are put it will not shrink so as to disarrange them and if there is any shrinkage from front to rear this may be easily remedied, by very slightly shifting the hinges or the alighting board. Fig. 8 shows the place for attaching the legs. These legs are about eight or ten inches long. They firmly support the whole superstructure, and enable the apiarian to move it about with ease and safety, and to reëstablish it in any place that he chooses, without the necessity of additional fixtures. By making the back legs about one and a half inches longer than the front ones (the backward slant of the outside cover must be greater than this) the whole hive will slant forward, and the bees will have all the advantages of hives whose bottom boards are inclined planes.

The arrangement which my platform enables me to give to the bottom board and entrance secures several important advantages:

(1st.) The outside cover of the hive may be raised without disturbing the bees that are entering or leaving the hive, and the very act of elevating it for inspecting the hive shows a protecting shield between the timid apiarian and the bees. Fig. 1 shows a rod which rests in a notch on the platform, and which supports the cover in its elevated position.

(2nd.) The entrance being a covered one, and inclining forward effectually prevents the wet from beating into the hive.

(3rd.) The bottom board, whether projecting or receding, may be easily opened and shut without hurting the bees and without affording the lurking places usual in common hives for moths or worms, while at the sime time, it is not below the level of the entrance so as to compel the bees at great loss of time, to drag their dead or anything that they carry out of the hive "up hill."

(4th.) When the bottom board projects, the moisture will run out between the chamfered edges of the bottom board and the alighting board. When the bottom board recedes the moisture will be discharged at once, from the cold sides of the hive on which it has condensed, without wetting the bottom board. The small amount of air all around admitted by this opening, will tend to keep the hive dry. Hives which are shut up too closely in cold weather are generally so damp as to cause the comb to mold.

(5th.) The platform arrangement in combination with the bottom board and entrance, enables me to give uncommon protection to the hive against the moth and worm while all the other advantages enumerated are preserved. There are no crevices large enough for moths or worms to harbor between the bottom board and the platform, whether the bottom board is a projecting or receding one and as the platform itself stands upon legs, there are no places between it and its supports, where moths or worms can secrete themselves.

During the whole of the breeding season, the bottom board should be lowered from time to time (this, from its construction, may be done without injury or serious annoyance to the bees,) and cleansed of all the particles of wax, bee-bread, etc., which fall upon it, and which are the favorite places for the eggs of the bee-moth and the nurture of her young until they have attained sufficient size to ascend into the combs. The timid apiarian by using the receding bottom-board, may dispense with lowering it. Let him pass his knife in the space all around the bottom-board and keep it clear of pupolis, and as there will be no crevice between the platform and the bottom-board which is inaccessible to the bees, the moths and worms will have no harbor. In the winter season, the bottom board should be dropped occasionally, and cleared of dead bees, or else when the bees carry out their dead—if there is snow on the ground—falling with them as they usually do, before they detach themselves from them, they are chilled and perish, and thus large numbers are lost at that season when the preservation of every bee is important. As the bees are quiet in cold weather, this operation may be performed by the most timid.

(6th.) When a new swarm is to be hived, the bottom board may be dropped so as to form an inclined plane up which the bees will readily ascend into the hive, so as to be easily and quickly hived, without any risk that any of them will be crushed or that their queen will be killed.

(7th) The platform arrangement gives a cheap support to my hives. As each hive has its own cover, and will stand firmly upon its legs, there is no necessity for expensive bee-houses and other cumbersome fixtures to shelter and support the hives. Bees, if properly protected, flourish best in the open air, and the bee houses and other fixtures in general use are favorite places of concealment for moths and worms.

The bottom board and platform should be made of thoroughly seasoned wood, and should be well painted with the Ohio Mineral Paint or some other paint possessing its valuable properties and containing no white lead, so offensive to bees. As the mineral paint thoroughly protects the wood against moisture, and soon hardens to a species of slate or stone, defying the ovi-depositor of the bee moth, I advise that all cracks in the interior of the hive and all corners or places which are not perfectly air tight and which the bees are wont to fill with pupolis (a favorite nidus for the eggs of the moth,) should be filled with this same paint. The outside cover of the hive and all the wood exposed to the weather should be thoroughly painted with the same material.

*Combined moth and worm trap.*—A trap to answer its professed object should possess at least the following requisites: (1st.) It should be near the only entrance by which the moth can get into the hive—and should during the moth season be filled with the heat and smell of the hive—or else the moth will avoid the trap. (2nd.) It should be made inaccessible to the bees, or else the moth will not so readily enter it. (3rd.) It should not allow the moth to pass directly from the trap into the hive, or else she will often enter the hive, instead of stopping to lay her eggs in the trap. (4th.) It should be so made and placed as to entrap the full grown worm when it leaves the hive to find a seucre place for spinning its cocoon, while at the same time it furnishes an inviting place for the moth to deposit her eggs. (5th.) It should be simple, requiring but little time for its management. I have invented a trap containing these and other desirable requisites.

In Fig. 6 the trap is seen in its proper position on the alighting board. Two are used for a hive—and they are made of wood or any other suitable material. Under the traps T, T, are cavities for holding a small piece of old comb—the refuse from the bottom boards or anything else in which the moth will deposit her eggs. In Fig. 11 —*a, a*—this cavity is shown. *b, b*—*c, c*, are entrances for the moth about one eighth of an inch deep, too small to admit a bee. —*d, d*— is a piece of gauze wire admitting the heat and odor of the hive from the covered entrance to the trap, and yet excluding the moth from the hive. From the entrances *b, b,* and *c, c* Fig. 6 the heat and scent of the hive are constantly proceeding to attract the moth. These entrances resemble the crevices between the bottom board and hive, by means of which the moth so frequently gains admission to the common hive. If the moth alights anywhere upon the alighting board *x, x, x*—Fig. 6— her instinct leads her at once to glide to the openings *b, b,* instead of passing on to the entrance of the hive over a surface, which, from the shape of the trap, is constantly narrowing, so as to be more and more strongly guarded by the bees. If the bees are not numerous, or the moth is very troublesome, the traps may be moved closer together, so as to contract the entrance and guard the hive more effectually. The full grown worm or larva of the bee moth, finds no suitable place in a well made hive, occupied by a flourishing colony, for spinning its cocoon, to undergo its transformation to a moth. In leaving the hive to find such a place it will, in accordance with its instincts, make for any crevices admitting of a hiding place, just as it crawls between the edges of ordinary hives and their bottom boards. Grooves may be made in the trap— Fig. 11—*g, g*—or on the front edge of the platform against which the trap abuts—or anywhere else, protected by the trap from the bees, and yet made easily accessible to the worms, into which the worms will readily enter to spin their cocoons.

The traps should be inspected about once a week during the moth season—and the worms and eggs destroyed. These traps serve other useful ends—by moving them closer together, the entrance to the hive may be contracted to guard against robber bees or entirely closed, and yet air will be admitted under the traps to the hive.

The peculiar shape of the trap, at all times, directs the bees to the entrance—and thus saves much time lost in searching for it—while it enables the apiarian to enlarge or contract the entrance to the hive, without perplexing the bees or wasting their time. Although the bee returns to her home with unerring precision from her flights abroad, yet unless the entrances are very judiciously arranged, they lose much valuable time in searcing for them after they have alighted. This is more especially the case, when the entrances are altered in any way.

These traps may be constructed in a great variety of ways and yet be made to answer substantially all their ends, provided their triangular shape is preserved. Simple triangular blocks will answer every purpose as a guide to the alighting bees and a protection against robbing bees.

What I claim as my invention, and desire to secure by Letters Patent is.

1. The use of a shallow chamber substantially as described, in combination with a perforated cover for enlarging or diminishing at will the size and number of the spare honey receptacles.

2. The use of the movable frames A, A, Fig. 4—or their equivalents—substantially as described—also their use in combination with the shallow chamber with or without my arrangement for spare honey receptacles.

3. A divider substantially as described in combination with a movable cover allowing the divider to be inserted from above between the ranges of comb.

4. The use of the double glass sides in a single frame substantially as and for the purposes set forth.

5. The construction of the trap for excluding moths and catching worms, so arranged as to increase or diminish at will the size of the entrance for bees, substantially in the manner and for the purposes set forth.

L. L. LANGSTROTH.

Witnesses:
E. D. SAUNDERS,
W. J. P. WHITE.

[FIRST PRINTED 1912.]